United States Patent [19]

Meyer et al.

[11] 4,401,734
[45] Aug. 30, 1983

[54] INSULATED FEEDTHROUGH EXPANSION SEAL

[75] Inventors: Theodore O. Meyer, Sunnyvale; Gerrit van Ommering, San Francisco, both of Calif.

[73] Assignee: Ford Aerospace & Communications Corporation, Detroit, Mich.

[21] Appl. No.: 297,374

[22] Filed: Aug. 28, 1981

[51] Int. Cl.³ .............................................. H01M 2/06
[52] U.S. Cl. .................................... 429/181; 429/185
[58] Field of Search ............... 429/178, 181, 183, 185, 429/174

[56] References Cited

U.S. PATENT DOCUMENTS

| | | | |
|---|---|---|---|
| 2,957,041 | 10/1961 | Ziegler | 174/152 R |
| 3,109,055 | 10/1963 | Ziegler | 174/152 R |
| 3,678,178 | 7/1972 | Hubbaner et al. | 429/181 X |
| 3,874,929 | 4/1975 | Greatbatch | 429/171 X |
| 4,053,692 | 10/1977 | Dey | 429/171 |
| 4,061,841 | 12/1977 | Sharma et al. | 429/174 X |
| 4,166,158 | 8/1979 | Mead et al. | 429/181 |
| 4,197,363 | 4/1980 | Topouzian et al. | 429/185 X |

*Primary Examiner*—Anthony Skapars
*Attorney, Agent, or Firm*—Edward J. Radlo; Robert D. Sanborn

[57] ABSTRACT

Disclosed is a seal which provides effective hermetic sealing of insulated metallic feedthroughs in metallic containers. The device has particular applicability in the fabrication of pressurized metal/gas battery cells such as those used in spacecraft. A conductive terminus protrudes through a metallic vessel which may be pressurized. It is desired to maintain electrical separation between the terminus and the wall of the vessel by means of a dielectric, which is compressed between the terminus and a metallic boss to provide a hermetic seal. The compressive force is applied radially outwardly by means of drawing a nondeformable pin through a hollow cylindrical barrel constituting the terminus, thereby slightly deforming the barrel and grossly deforming the dielectric. The pin may be either pulled out of the barrel from within the vessel or pushed into the barrel from outside the vessel, but in each case force is applied radially outwardly in a gradual, relatively frictionless fashion. A method for constructing a high pressure battery employing such a seal is described.

3 Claims, 8 Drawing Figures

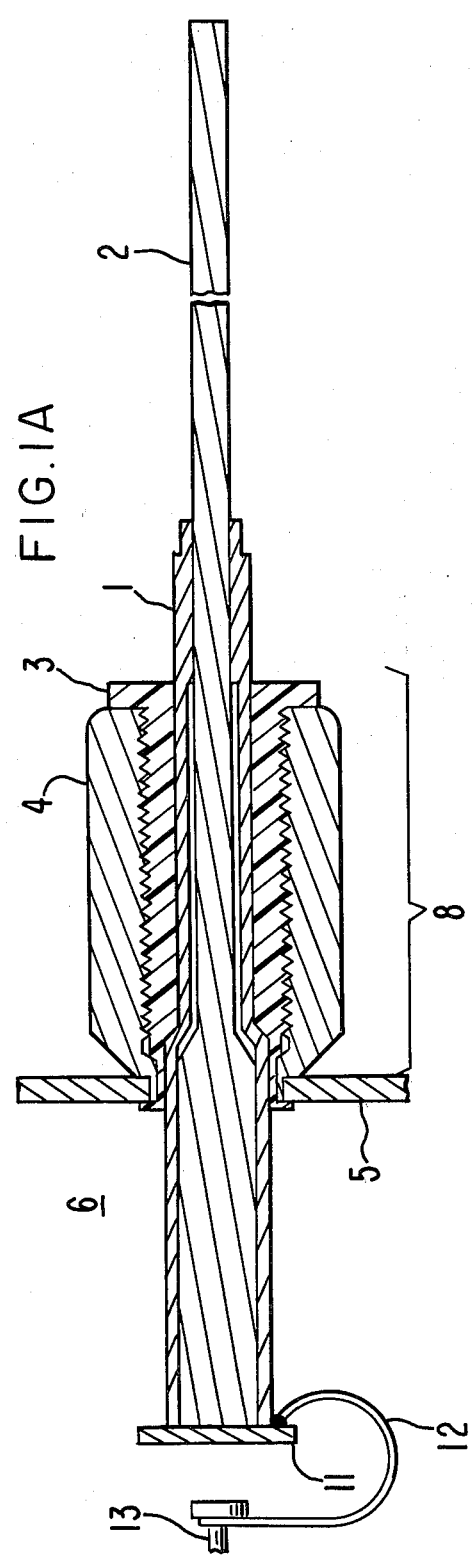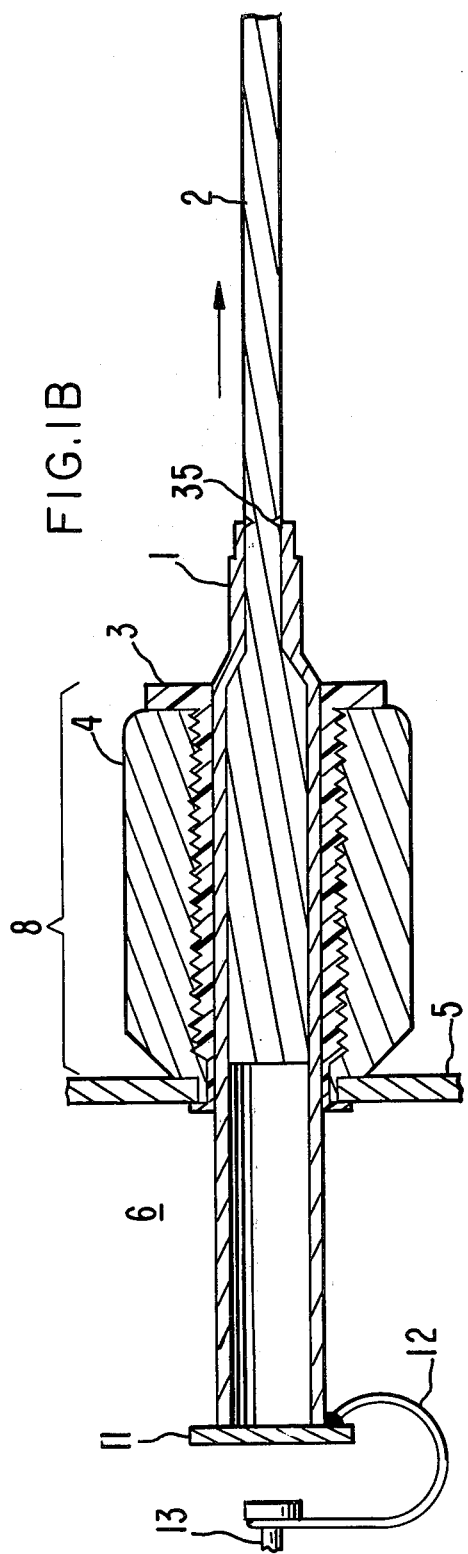

INSULATED FEEDTHROUGH EXPANSION SEAL

BACKGROUND OF THE INVENTION

1. Field of the Invention

The invention pertains to a hermetic feedthrough seal, wherein an inner conductor is electrically insulated from an outer vessel. The invention can be used, for example, in a pressurized battery used in a spacecraft.

2. Description of the Prior Art

U.S. Pat. No. 3,109,055 is typical of prior art devices wherein the seal is achieved by applying a radially inward crimping force to deform an outer metallic boss and an inner dielectric. The present invention, on the other hand, applies a compressive force in a radially outward direction.

U.S. Pat. No. 3,678,178 applies an inward compressive force to achieve a terminal seal, by means of turning nuts. This results in an uneven compression of the inner dielectric as well as the disadvantages of prior art techniques referenced below under "Summary of the Invention". The present invention employs a radially outward compressive force.

U.S. Pat. No. 4,053,692 discloses a glass to metal seal for separating metal electrodes in a battery cell, wherein the glass is melted. This seal is not amenable to high pressure applications. The present invention, on the other hand, is suited for high pressure applications, and employs a dielectric which is not glass and is not melted.

U.S. Pat. No. 4,197,363 discloses a seal for a sodium sulfur battery but does not pertain to a pressurized battery. The function of the seal is to keep two liquid electrodes apart. The compressive force is applied inwardly, compressing a soft metal by a hard ceramic. In the present invention, on the other hand, the seal is able to withstand high pressures; the compressive force is radially outward; and the electrodes are metal.

Secondary references are: U.S. Pat. Nos. 2,957,041; 3,874,929; 4,061,841; and 4,166,158.

SUMMARY OF THE INVENTION

In typical compression seals of the prior art used for separating conductive electrodes in pressurized batteries (FIG. 2), a conductive cylindrical electrode 21 is surrounded by a dielectric hollow-cylindrical sleeve 23 which is in turn surrounded by an inner-threaded metallic boss 24 in the shape of a hollow-cylindrical sleeve. To effect the seal, the boss is compressed radially inwardly by external crimping means and thereby permanently deformed, whereby the dielectric 23 is placed under elastic compression, so as to maintain sealant contact with the two conductive surfaces 21 and 24. This seal requires completely unrestricted access around the outside of boss 24 for the crimping operation. In FIG. 2, 25 represents the wall of a pressurized vessel defining the outer periphery of a battery cell; 26 is a support for an electrode stack (not depicted); 27 is a weld surface; and 28 is a bus bar.

On the other hand, the present invention achieves a hermetic seal by means of drawing a nondeformable pin 2 through a deformable electrically conductive barrel 1, thereby compressing a dielectric 3 against a nondeformable electrically conductive terminal boss 4 that is affixed to wall 5 of vessel 6 (FIG. 1). The present invention has the following advantages over the prior art:

1. The seal can be located in any desired location on the wall of the vessel, including confined spaces.

2. The boss can be integrated into the pressure vessel, because each can be fabricated of the same nondeformable material, thereby reducing the overall volume. This is very important in spacecraft battery applications.

3. For feedthroughs through thick walls, the wall itself can be drilled and threaded and utilized as the boss.

4. The boss, the vessel, and the weld between the two can be brought to an optimum strength condition simultaneously, making for a stronger overall structure.

5. The boss can be lighter and thinner than in the prior art because it can be brought to optimum strength, withstands the same pressure as in the prior art, and yet is not required to be deformed.

The seal of the present invention can be effectuated by preassembling some of the parts of the battery in the following fashion: weld the boss to one half of the pressure vessel; age harden the boss and the pressure vessel simultaneously; injection mold the dielectric into the interior of the boss using a reusable insert having an outer diameter slightly bigger than the inner diameter of the barrel; assemble and the barrel/pin combination with a connecting wire; assemble the remainder of the battery cell by sliding the barrel/pin combination through the hole in the boss/dielectric; weld the pressure vessel halves together; draw out the pin; cut off the unwanted portion of the pin; and fill the battery cell with electrolyte.

Alternative to the above, the seal can be effectuated by pushing a pin in from the outside of the vessel rather than pulling it out from the inside. This embodiment is illustrated in FIG. 5. In each of the FIG. 1 and FIG. 5 embodiments, the compressive force is applied radially outwardly.

BRIEF DESCRIPTION OF THE DRAWINGS

These and other more detailed and specific objects of the present invention are more fully disclosed in the following specification, reference being had to the accompanying drawings, in which:

FIG. 1 is a cross-sectional side view of the components of the seal of the present invention; FIG. 1(A) depicts the components prior to drawing out the drawpin, and FIG. 1(B) depicts the components subsequent to drawing out of the pin.

FIG. 5 is an illustration of an alternative embodiment of the present invention, wherein the pin is pushed from outside the vessel into the interior.

DESCRIPTION OF THE PREFERRED EMBODIMENTS

Figure 2:
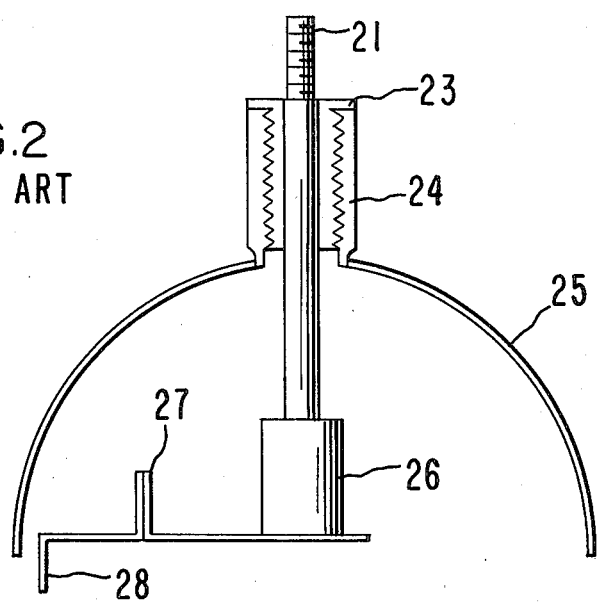
FIG. 2 is a schematic illustration of a typical externally compressed seal of the prior art.

FIG. 1 illustrates the components of the preferred embodiment of the seal of the present invention incorporated in a terminal 8. Terminal boss 4 is an elongated right circular cylindrical sleeve with internal threads that is fabricated of a nondeformable electrically conductive material, such as a metal. For the application of the invention to a pressurized metal/gas battery, Inconel is an ideal material for terminal boss 4 because: (1) the pressure vessel to which the boss is welded is typically Inconel, and it is easier to weld one material to a like material; and (2) Inconel forms a noncorrosive contact with the liquid electrolyte in the interior of the battery cell.

Wall 5 is a wall of a pressurized vessel 6 such as a metal/gas battery. Wall 5 is typically welded to terminal boss 4. Wall 5 forms the outer periphery of vessel 6, the interior of which is on the left of wall 5 and the exterior of which is on the right of wall 5. In the application to a pressurized metal/gas battery, such as a nickel/hydrogen battery, the interior of the battery is on the left side of wall 5; this is the embodiment which is discussed in most detail herein. However, it will be readily understood that this invention has applicability to many other devices as well. For example, wall 5 could be a flat plate in which the words "interior" and "exterior" are used for purposes of convention only. Alternatively, boss 4 could be located on the left of wall 5, or part on the left and part on the right of wall 5.

Dielectric 3 is a material which provides good electrical insulation between boss 4 and barrel 1, and is substantially in the shape of an elongated right circular cylindrical sleeve. The dielectric must be compressible. Nylon is a suitable choice of materials for the room temperature application of a pressurized metal/gas battery.

The purpose for the threads on the interior cylindrical surface of boss 4 is to trap the compressed dielectric 3 subsequent to creation of the seal.

Barrel 1 is substantially in the shape of an elongated right circular cylindrical sleeve fabricated of a material such as a soft metal having good electrical conductivity. Nickel 200 or 270 is a suitable choice for the embodiment where a substance within the interior of vessel 6 is corrosive, such as the corrosive electrolyte in a metal/gas battery. If corrosion were not a factor, copper and aluminum would be suitable candidate materials for barrel 1.

Drawpin 2 is a nondeformable member, such as a high strength metal or alloy, which is substantially in the shape of a right circular cylinder having varying outer diameter. Pin 2 does not have to be electrically conductive. When drawpin 2 is conductive, it normally doesn't contribute much to the electrical characteristics of terminal 8 because of the lubricant normally applied along the outside of pin 2 prior to fabrication of the seal to minimize the friction as pin 2 is pulled through terminal 8. This lubricant may be a dielectric substance such as molybdenum disulfide; this is more suitable than a liquid lubricant because the liquid could get squeezed out in such an application. A molybdenum disulfide suspension may be sprayed onto drawpin 2 and dried prior to its insertion into barrel 1.

Dielectric 3 is shown as having a flange on its rightmost end, so as to provide for electrical insulation between terminal boss 4 and the rightmost end of barrel 1 when the latter has an electrically conductive nut threaded around it for mounting purposes.

FIG. 1(A) illustrates the configuration prior to formation of the seal. It can be seen that drawpin 2 is situated almost as far to the left within barrel 1 as is possible. To effectuate the seal, pin 2 is pulled to the right out to where its region of widest diameter is vertically aligned with terminal boss 4, as depicted in FIG. 1(B). The rightmost end of drawpin 2 may be then cut off.

End plate 11 is bonded to the leftmost end of barrel 1 to provide isolation between drawpin 2 and the material in the interior of vessel 6, which may be a corrosive electrolyte. End plate 11 is typically fabricated of the same material as barrel 1 and is welded thereto. Also welded to end plate 11 and/or barrel 1 is a conductive member 12 such as a wire, which, in the battery embodiment, is connected on its other end to conductive electrode 13 within the battery.

Figure 3:
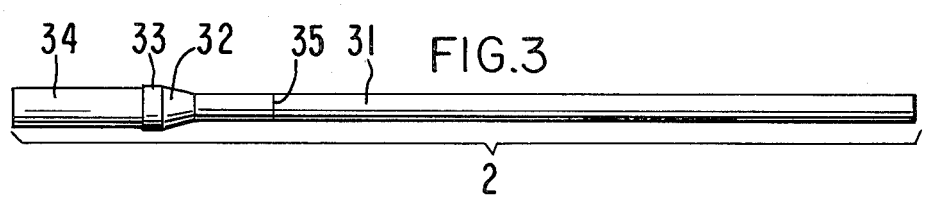
FIG. 3 is a side view of drawpin 2 of FIG. 1.

FIG. 3 illustrates the details of drawpin 2. There are four distinct regions of drawpin 2. The leftmost region, trailing cylinder 34, has an outer diameter slightly less than that of leading cylinder 33. The purpose of trailing cylinder 34 is to provide inner support for the assembled terminal 8 following the sealing operation. The function of leading cylinder 33 is to apply a radially outward compressive force to the inside of barrel 1 and thence to dielectric 3 as pin 2 is pulled from left to right in FIG. 1. The reason that the outer diameter of trailing cylinder 34 is slightly less than that of leading cylinder 33 is to minimize the friction between the outer surface of pin 2 and the inside of barrel 1 as pin 2 is pulled.

Tapered region 32 serves to gradually diminish the outer diameter of drawpin 2 as one traverses pin 2 from left to right. The function of tapered region 32 is to provide for smooth continuity in the compressive force as pin 2 is moved from left to right in FIG. 1.

Pull rod region 31 has a lesser outer diameter than leading cylinder 33 and trailing cylinder 34. The function of pull rod 31 is to provide a means by which a person or machine may pull drawpin 2 through terminal 8.

A notch 35 may be cut part way into the outer circumference of pin 2 in pull rod 31. Notch 35 facilitates the breaking off of the unwanted portion of drawpin 2 which protrudes beyond terminal 8 subsequent to formation of the seal.

Figure 4:
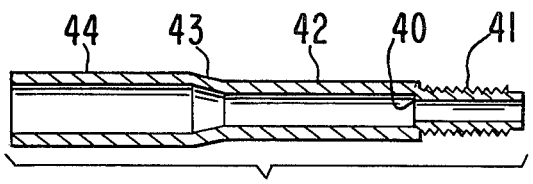
FIG. 4 is a cross-sectional side view of barrel 1 of FIG. 1.

The details of barrel 1 are illustrated in FIG. 4. It can be seen that barrel 1 is an elongated right circular cylindrical sleeve having four different inner diameters, represented by sections 44, 43, 42, and 41. Section 44, the leftmost portion on FIG. 1, has the largest outer diameter. The inner diameter of section 44 is slightly larger than the outer diameter of leading cylinder 33 of drawpin 2. Section 44 does not get deformed. Section 42 has a smaller initial (preseal) inner diameter than section 44. The initial inner diameter of section 42 is less than the outer diameters of leading cylinder 33 and trailing cylinder 34 of drawpin 2. Section 42 does get deformed by pin 2. Section 43 is a uniformly tapered section connecting sections 44 and 42.

Section 41 has a smaller inner diameter than each of sections 42 and 44. Section 41 does not get deformed. Its outer surface may be threaded to facilitate electrical connection to barrel 1 by means of a threaded nut.

Stop 40, the surface within the interior of barrel 1 connecting sections 42 and 41, may be formed at a right angle as shown in FIG. 4; this forms an effective surface for stopping the tapered region 32 of drawpin 2 as the pin 2 is moved from left to right. Tapered region 32 may have a right-angled indentation in the vicinity of the left end of pull rod 31, which indentation mates with stop 40, thus providing a discrete surface facilitating the stopping of pin 2 as it is moved from left to right within barrel 1. The outer diameter of the widest portion of the indentation should be smaller than the inner diameter of section 42 so that the indentation will not catch on the left portion of section 42 as pin 2 is moved from left to right.

A pressurized gas/metal battery can be fabricated using the seal of the present invention by following the below steps:

1. Terminal boss 4 is welded to wall 5 of that half (or other portion) of pressure vessel 6 which is to be fitted with terminal 8.

2. Boss 4 and wall 5 are age hardened together.

3. Dielectric 3 is injection molded into the opening having the shape of an elongated right circular cylindrical sleeve that is formed between the interior of boss 4 and the exterior of a similarly elongated right circular cylindrical insert (not illustrated) having an outer diameter slightly larger than the initial outer diameter of section 42 of barrel 1. The reason the insert is slightly bigger is so that barrel 1 can subsequently be inserted into the hole easily. After the plastic or other dielectric 3 hardens, the insert is removed.

4. Pin 2 inserted within barrel 1. Plate 11 is then welded onto barrel 1 and wire 12 is welded onto plate 11. This step 4 could, alternatively, be done concurrently with or prior to either of steps 1, 2, or 3 above.

5. The remainder of the interior of vessel 6 is assembled, including the connection of wire 12 to electrode 13, and the insertion of the barrel 1/pin 2 assembly into the interior of the cylindrical opening formed by the interior of dielectric 3. At this stage, the assembly is illustrated in FIG. 1(A).

6. The halves of pressure vessel 6 are welded together.

7. Drawpin 2 is pulled from left to right in FIG. 1 thereby deforming section 42 of barrel 1 and dielectric 3 as illustrated in FIG. 1(B). Drawpin 2 is then broken off at notch 35. Pin 2 may subsequently be bonded or welded to barrel 1.

8. Vessel 6 is filled with electrolyte.

Figure 5A:
FIG. 5(A) is a side view of the push pin of the embodiment.

Alternative to the above embodiment, the seal may be formed by pushing a pushpin 50 from the exterior to the interior of vessel 6 as illustrated in FIG. 5, where again the interior of vessel 6 is represented as being to the left of wall 5. Pushpin 50 is analogous to drawpin 2. Optional front region 54 of pin 50 serves mainly to position pin 50 within the interior of barrel 60, which is analogous to barrel 1. Tapered region 53 of pin 50 serves to gradualize the radially outward compressive force exerted by pin 50 within barrel 60. Dielectric 3, boss 4, and wall 5 have been omitted from FIG. 5 because they are analogous to corresponding items in FIG. 1.

Leading cylinder 52 of pin 50 has the same function as leading cylinder 33 of pin 2, and trailing cylinder 51 of pin 50 has the same function and diameter constraints as trailing cylinder 34 of pin 2, and in addition provides means by which one may employ motive force to push pin 50 from right to left.

Figure 5B:
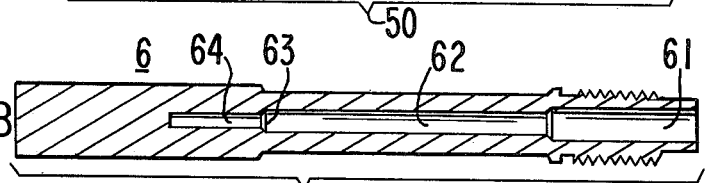
FIG. 5(B) is a cross-sectional side view of the terminal barrel of the embodiment shown prior to insertion of the pin.

In FIG. 5(B), the predetermined state of barrel 60 is shown. Receptacle chamber 64 does not deform. Stop 63 serves to impede the progress of tapered region 53 of pin 50 and provides a connection between chamber 64 and section 62, which has a larger initial inner diameter than chamber 64. Section 62 is deformed radially outwardly by leading cylinder 52 of pin 50. Section 62 is connected to section 61, which has a larger initial inner diameter than section 62. Section 61 is not deformed.

Figure 5C:
FIG. 5(C) is a cross-sectional side view of the terminal barrel of the embodiment shown subsequent to insertion of the pin.

Finally, FIG. 5(C) illustrates the terminal seal after pin 50 has been inserted into barrel 60. Excess portions of trailing cylinder 51 extending beyond barrel 60 can be cut off. Alternatively, cylinder 51 could be just long enough to provide support for deformable section 62; in this case, cylinder 51 can be pushed in by retractable external means.

The above description is included to illustrate the operation of the preferred embodiments, and is not meant to limit the scope of the invention. The scope of the invention is to be limited only the following claims. From the above discussion, many variations will be apparent to one skilled in the art that would yet be encompassed by the spirit and scope of the invention.

What is claimed is:

1. A feedthrough seal assembly for providing electrical insulation between an inner conductor and an outer conductor, comprising:
   an outer electrical conductor roughly in the shape of a hollowed-out cylinder;
   disposed within said outer conductor, a compressible dielectric roughly in the shape of a hollowed-out cylinder;
   disposed within said dielectric, a deformable inner electrical conductor roughly in the shape of a hollowed-out cylinder; and
   disposed within said inner conductor, a rigid pin roughly in the shape of a cylinder,
   wherein said pin has a compressing region having a first outer diameter and a push/pull region having a second outer diameter smaller than said first outer diameter.

2. Apparatus of claim 1 wherein said inner conductor has a first section having a first inner diameter and a second section having a second inner diameter smaller than said first inner diameter;
   wherein said compressing region fits within said first section and said push/pull region fits within said second section.

3. Apparatus of claim 2 wherein said seal is formed by drawing said pin through said inner conductor so that said compressing region expands radially outwardly the second section of said inner conductor, thereby compressing said dielectric between said inner and outer conductors.

* * * * *